United States Patent
Gupta et al.

(10) Patent No.: US 8,943,322 B2
(45) Date of Patent: *Jan. 27, 2015

(54) SYSTEMS AND METHODS FOR AUTHENTICATING AN ELECTRONIC TRANSACTION

(75) Inventors: Vikas Gupta, Palo Alto, CA (US); Luke Bayes, San Francisco, CA (US); Allan Mills, San Francisco, CA (US); Mikhail Seregine, Seattle, WA (US); Hemant Madhav Bhanoo, San Francisco, CA (US)

(73) Assignee: Google Inc., Mountain View, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 13/620,698

(22) Filed: Sep. 14, 2012

(65) Prior Publication Data

US 2013/0019098 A1   Jan. 17, 2013

Related U.S. Application Data

(63) Continuation of application No. 12/607,005, filed on Oct. 27, 2009, now Pat. No. 8,296,568.

(51) Int. Cl.
*H04L 9/32* (2006.01)

(52) U.S. Cl.
CPC .............. *H04L 9/321* (2013.01); *H04L 9/3247* (2013.01); *H04L 2209/56* (2013.01)
USPC .......................................................... 713/171

(58) Field of Classification Search
USPC ........................ 726/22–25; 713/150, 168, 171
See application file for complete search history.

(56) References Cited

U.S. PATENT DOCUMENTS

| 5,864,620 | A  | 1/1999 | Pettitt |
| 6,256,393 | B1 | 7/2001 | Safadi et al. |
| 6,990,470 | B2 | 1/2006 | Hogan et al. |

(Continued)

FOREIGN PATENT DOCUMENTS

| CN | 1757195    | 4/2006 |
| EP | 1 233 333 A1 | 8/2002 |

(Continued)

OTHER PUBLICATIONS

JAVA Security Architecture, EPO Supplementary Search—Internet Citation, pp. 1-62, Dec. 6, 1998.

(Continued)

*Primary Examiner* — Anthony Brown
(74) *Attorney, Agent, or Firm* — Johnson, Marcou & Isaacs, LLC

(57) ABSTRACT

Systems and methods for authenticating a request between a client computer and a transaction server are provided. An application request, comprising an identity of a user originating the request, is received at an application server from the client. The application server constructs a signing key based on (i) the identity of the user making the request, (ii) a time based salt value, (iii) a secret shared between the application and transaction servers and, optionally, (iv) an identifier of the distributor or developer of the application. The signing key is embedded in an unbranded version of the application thereby branding the application. The branded application can sign a request with the signing key and submit the signed request to the transaction server with the identity of the user and the identifier of the distributor or developer of the application.

29 Claims, 2 Drawing Sheets

(56) References Cited

U.S. PATENT DOCUMENTS

| | | | |
|---|---|---|---|
| 7,069,271 | B1 | 6/2006 | Fadel et al. |
| 7,809,525 | B2 | 10/2010 | Chagoly et al. |
| 8,296,568 | B2 | 10/2012 | Gupta et al. |
| 8,364,959 | B2 | 1/2013 | Bhanoo et al. |
| 2002/0116341 | A1 | 8/2002 | Hogan et al. |
| 2004/0024641 | A1 | 2/2004 | Cartwright |
| 2004/0215964 | A1 | 10/2004 | Barlow et al. |
| 2004/0230797 | A1* | 11/2004 | Ofek et al. .................... 713/168 |
| 2005/0091536 | A1 | 4/2005 | Whitmer et al. |
| 2006/0056281 | A1 | 3/2006 | Ngo et al. |
| 2006/0056284 | A1 | 3/2006 | Wei et al. |
| 2006/0110012 | A1* | 5/2006 | Ritter ............................ 382/115 |
| 2006/0136727 | A1 | 6/2006 | Voss et al. |
| 2006/0294102 | A1* | 12/2006 | Reddish et al. ................... 707/9 |
| 2007/0198840 | A1 | 8/2007 | Lee et al. |
| 2008/0034216 | A1 | 2/2008 | Law |
| 2008/0208749 | A1 | 8/2008 | Wallace et al. |
| 2008/0313648 | A1 | 12/2008 | Wang et al. |
| 2009/0044019 | A1 | 2/2009 | Lee et al. |
| 2009/0048997 | A1 | 2/2009 | Manickam et al. |
| 2009/0070582 | A1 | 3/2009 | Aura et al. |
| 2009/0177544 | A1 | 7/2009 | Sugahara |
| 2010/0017627 | A1 | 1/2010 | Prineen et al. |
| 2010/0023757 | A1 | 1/2010 | Nguyen-Huu et al. |
| 2011/0137797 | A1 | 6/2011 | Stals et al. |
| 2011/0214115 | A1 | 9/2011 | Kuusilinna et al. |
| 2011/0246290 | A1 | 10/2011 | Howard et al. |
| 2014/0033086 | A1 | 1/2014 | Hebbar |

FOREIGN PATENT DOCUMENTS

| | | |
|---|---|---|
| JP | 2003-5857 A | 1/2003 |
| JP | 2004-272669 A | 9/2004 |
| JP | 2005-332208 A | 12/2005 |
| WO | WO 01/98991 | 12/2001 |
| WO | WO 2011/056664 A1 | 5/2011 |
| WO | WO 2011/150204 A2 | 12/2011 |

OTHER PUBLICATIONS

Aura et al., Software License Management with Smart Cards, Internet Citation: 1990, XP002304700 URL: http://citeseer.ist.psu.edu/aura99software.html, pp. 1-12, Jan. 1, 1999.

Di, Felice, M., EPO Search Report—Application No. 10828899.4, pp. 1-5, Jun. 12, 2013.

Miyaji, T., Japanese Office Action issued in copending Appl. No. 2013-512239, pp. 1-3, Apr. 23, 2013.

Savin, D., Canadian Office Action issued in copending Canadian Application No. 2,800,657, pp. 1-2, May 17, 2013.

Van Dop, E., EPO Supplementary Search Report issued in copening EPO Appl. No. 11787410.7, pp. 1-4, May 7, 2013.

Brown, A., Office Action issued in U.S. Appl. No. 12/607,005, filed Oct. 27, 2009, pp. 1-23, Mar. 13, 2012.

Lindner, N., International Preliminary Report on Patentability for International Patent Application No. PCT/US2010/054316, pp. 1-7, May 1, 2012.

Young, L., International Search Report and Written Opinion for International Patent Application No. PCT/US2010/054316, pp. 1-10, Jan. 6, 2011.

U.S. Appl. No. 12/607,005, filed Oct. 27, 2009.

U.S. Appl. No. 12/788,173, filed May 26, 2010.

Mehta, C., Australian Office Action issued in Application No. 2013205188, pp. 1-2, Nov. 22, 2013.

Zhou, Y., Chinese Office Action issued in Application No. 201080058159.9, pp. 1-7, Nov. 5, 2013.

Van Dop, E., EPO Office Action issued in EPO Application No. 11787410.7, pp. 1-4, Jan. 3, 2014.

U.S. Appl. No. 13/747,280 to Bhanoo et al. filed Jan. 22, 2013.

Di Felice, M., EPO Substantive Exam Report—Application No. 10 828 899.4, pp. 1-6, Oct. 7, 2013.

Moon, N., Korean Office Action issued in Application No. 10-2012-7033385, pp. 1-8, Aug. 5, 2013.

Van Dop, E., EPO Examination Report issued in Application No. 11 787 410.7, pp. 1-5, Jul. 3, 2013.

Zhou et al., CN Office Action issued in Chinese Application No. 201180030292.8, pp. 1-11, Jan. 13, 2014.

Zhou, Y., Chinese Office Action issued in Application No. 201080058159.9, pp. 1-6, Jan. 13, 2014.

Gyorfi, T., Office Action issued in copending U.S. Appl. No. 13/747,280, filed Jan. 22, 2013, pp. 1-17, Sep. 24, 2014.

Van Dop, E., EPO Office Action issued in EPO Application No. 11787410.7, pp. 1-6, Oct. 1, 2014.

* cited by examiner

SYSTEMS AND METHODS FOR AUTHENTICATING AN ELECTRONIC TRANSACTION

RELATED APPLICATION

This application is a continuation of and claims priority to U.S. patent application Ser. No. 12/607,005, filed Oct. 27, 2009 now U.S. Pat. No. 8,296,568, and entitled "Systems and Methods for Authenticating an Electronic Transaction." The complete disclosure of the above-identified priority application is hereby fully incorporated herein by reference.

1. FIELD OF THE INVENTION

The present application relates generally to systems and methods for authenticating an electronic transaction that is originated from an application that may not be secure.

2. BACKGROUND

The number of potentially unsecure applications running on client computers that, nevertheless, require secure real time transaction services, continues to grow. One non-limiting example of such applications are FLASH-based gaming applications that require replenishment of virtual currency in order to buy in-game upgrades like level unlocks, virtual equipment, virtual special weapons and cheats directly to garners. Securing such real time transactions is needed in the art to protect users and application developers from fraudulent acquisition of account information, identity theft, and other forms of fraud.

One known method for securing such transactions is the concept of using a shared secret (secret key cryptography). Secret key cryptography involves the use of a single key. Given a message and the key, encryption produces unintelligible data which requires the key to decrypt. See, for example, Section 2.4 of Kaufman, Network Security, Prentice-Hall, Inc., Upper Saddle River, N.J., which is hereby incorporated by reference. However, the shared secret method does not work in instances where one of the applications is not secure. For example, many popular programming applications are executed by FLASH players and are not secure. Typically, when a shared secret algorithm is used, there is a remote web server calling a local web server. The secret is safe on the remote web server and the local web server and is not communicated between the two servers. This fails when the application is written in FLASH or other programs that are downloaded to a client computer and run, for example, within the client's browser. In the case of FLASH, when a user requests a FLASH application, a SWF file that contains bytecode that is interpreted by a FLASH player is down-loaded to the client computer and run (interpreted) by a FLASH player within the client's browser. The bytecode in the SWF file can be inspected at the client computer to determine the secret. Thus, secrets cannot be contained within a FLASH SWF file.

Given the above background, what is needed in the art are improved systems and methods for authenticating electronic transactions originated from applications that may not be secure.

3. SUMMARY

The present disclosure addresses deficiencies in the art. One aspect provides method for authenticating an electronic request between a client computer and a transaction server. In the method an electronic application request for an application is received at a suitably programmed application server from a client computer. The electronic request comprises an identity of a user originating the electronic request. Using the suitably programmed application server and responsive to the receiving, a signing key is constructed as a first function of a plurality of parameters comprising (i) an identity of a user originating the electronic request for the application, (ii) a first time based salt value, and (iii) a secret that is shared between the suitably programmed application server and the transaction server. In some embodiments, the plurality of parameters further comprises an identifier that identifies the distributor or developer of the application.

In some embodiments, the signing key is embedded in an unbranded version of the application thereby forming a branded version of the application by the application server. In such embodiments, the branded application is delivered to the client computer. In some embodiments, the application server does not brand the application with the signing key but rather passes the signing key to the client browser. In such embodiments, the client browser itself brands the application with the signing key. Regardless of how the branded version of the application is constructed, the branded version of the application is configured to (i) sign a request with the signing key thereby forming a signed request (e.g., a request that includes a signature generated based on the signing key) and (ii) submit the signed request to the transaction server, optionally with the identity of the user and the identifier that identifies the distributor or developer of the application.

In some embodiments, the first function is a hashing function and the signing key is a hash of (i) the identity of the user originating the electronic request for the application, (ii) the identifier that identifies the distributor or developer of the application, (iii) the first time based salt value, and (iv) the secret that is shared between the suitably programmed application server and the transaction server.

In some embodiments, the first function is a hashing function and the signing key is a hash of (i) the identity of the user originating the electronic request for the application, (ii) the first time based salt value, and (iii) the secret that is shared between the suitably programmed application server and the transaction server.

In some embodiments, the first time based salt value is an integer divide of (i) Coordinated Universal Time (UTC) associated with the receiving (A) and (ii) a predetermined time increment. In some embodiments, the first time based salt value is an integer divide of (i) Coordinated Universal Time (UTC) associated with the constructing (B) and (ii) a predetermined time increment.

In some embodiments, the signed transaction request is an in-game transaction to buy an in-game upgrade using an account associated with the identity of the user that is maintained on the transaction server. In some embodiments, the in-game upgrade is a level unlock, a purchase of virtual equipment, a purchase of a virtual special weapon, a purchase of a cheat, or a purchase of virtual currency.

In some embodiments, the application is a social networking application, a financial services application, an accounting application, or a tax preparation application.

In some embodiments, the method further comprises executing the branded application using the client computer, where the client computer is suitably programmed to execute the branded application. Then, the executed branded application is used to make a request that is signed with the signing key and this request is communicated to the transaction server. In some embodiments the signed request includes the identity of the user and, optionally, the identifier that identifies the distributor or developer of the application.

In some embodiments, the method further comprises receiving the signed request at the transaction server whereupon the transaction server ascertains the validity of the signed request by (i) using its version of the secret key to generate a reconstructed signing key and then (ii) using the reconstructed signing key to form a reconstructed signature. For purposes of clarity, the signing key generated by the transaction server is referred to herein as the "reconstructed signing key." For purposes of clarity, the reconstructed signature formed using the transaction server from the reconstructed signing key is referred to herein as the reconstructed signature. If the reconstructed signature matches the signature in the request, then the transaction server "trusts" the request and will service it. The transaction server generates a reconstructed signature key using the exact same function that was used by the application server to creating a signing key. For purposes of clarity, the function used by the transaction server to generate a reconstructed signing key from the secret key is referred to herein as "the second function" whereas the function used by the application server to generate the signing key from the secret key is referred to herein as "the first function." However, it will be appreciated that the first function and the second function are necessarily identical to each other, although they run on separate servers. With this in mind, and depending on the nature of the first function run by the application server, the transaction server forms a reconstructed signing key by applying a second function to a second plurality of parameters. In some embodiments the second plurality of parameters comprises: (i) the identity of the user making the request, (ii) a second time based salt value, and (iii) the secret that is shared between the suitably programmed application server and the transaction server. In some embodiments the second plurality of parameters further comprises an identifier that identifies the distributor or developer of the application. The transaction server then forms a reconstructed signature from the reconstructed signing key. The transaction server then verifies the transaction request by comparing the reconstructed signature to the signature in the request.

In some embodiments, the second function is a hashing function and the reconstructed signing key is a hash of (i) the identity of the user originating the electronic request for the application, (ii) optionally, the identifier that identifies the distributor or developer of the application, (iii) the second time based salt value, and (iv) the secret that is shared between the suitably programmed application server and the transaction server. In some embodiments, the second time based salt value is an integer divide of (i) Coordinated Universal Time (UTC) associated with the step of receiving the request at the transaction server or the verification steps taken by the transaction server (e.g., the time when these steps occurred) and (ii) the predetermined time increment.

In some embodiments, the aforementioned verifying determines that the reconstructed signature does not match the signature in the request. In some such instances, the method further comprises reattempting to form the reconstructed signing key and, therefore, a new reconstructed signature, with the second time based salt value incremented or decremented.

As mentioned above, when the verification is successful, the transaction server services the request. In some embodiments, the suitably programmed application server is a server other than the transaction server. In some embodiments, the suitably programmed application server and the transaction server is the same server. In some embodiments, the application is a FLASH application. As used herein, the term "server" is used broadly to mean any computer that is deemed to be secure enough to store a secret key and that is capable of electronically communicating with another computer by any means (e.g., wireless communication, the Internet, data cable, and the like).

Another aspect provides a computer program product for use in conjunction with a computer system, the computer program product comprising a computer readable storage medium and a computer program mechanism embedded therein. The computer program mechanism is for authenticating an electronic request between a client computer and a transaction server. The computer program mechanism comprises computer executable instructions for receiving an electronic request for an application from the client computer. This electronic request comprises an identity of a user originating the electronic request. The computer program mechanism further comprises computer executable instructions constructing, responsive to the receiving, a signing key as a first function of a plurality of parameters comprising: (i) an identity of a user originating the electronic request for the application, (ii) a first time based salt value, and (iii) a secret that is shared between the computer program mechanism and the transaction server. In some embodiments, this plurality of parameters further comprises an identifier that identifies the distributor or developer of the application.

In some embodiments, the computer program mechanism further comprises computer executable instructions for embedding the signing key in an unbranded version of the application thereby forming a branded version of the application, where the branded version of the application is configured to (i) sign a request with the signing key thereby forming a signed request, and (ii) submit the signed request to the transaction server with the identity of the user and the identifier that identifies the distributor or developer of the application. In such embodiments, the computer program mechanism further comprises computer executable instructions for electronically delivering the branded version of the application to the client computer.

In some alternative embodiments, the computer program mechanism further comprises computer executable instructions for electronically delivering the signing key to a client computer which, in turn, brands an unbranded version of the of the application thereby forming a branded version of the application. In these alternative embodiments, the branded version of the application is configured to (i) sign a request with the signing key thereby forming a signed request, and (ii) submit the signed request to the transaction server with the identity of the user and, optionally, the identifier that identifies the distributor or developer of the application.

Another aspect provides a system comprising means for receiving an electronic request for an application from a client computer, where the electronic request comprises an identity of a user originating the electronic request. The system further comprises means for constructing, responsive to the receiving, a signing key as a function of a plurality of parameters comprising (i) an identity of a user originating the electronic request for the application (ii) a time based salt value, and (iii a secret that is shared between the system and a transaction server. In some embodiments, the plurality of parameters further comprises an identifier that identifies the distributor or developer of the application.

In some embodiments, the system further comprises means for embedding the signing key in an unbranded version of the application thereby forming a branded version of the application, where the branded version of the application is configured to (i) sign a request with the signing key thereby forming a signed request, and (ii) submit the signed request to the transaction server with the identity of the user and, optionally, the identifier that identifies the distributor or developer of the application. In such embodiments, the system further comprises means for electronically delivering the branded version of the application to the client computer.

In some alternative embodiments, the system further comprises means for delivering the signing key to the client computer which uses the signing key to brand an unbranded version of the application thereby forming a branded version of the application. The branded version of the application is configured to (i) sign a request with the signing key thereby forming a signed request, and (ii) submit the signed request to the transaction server with the identity of the user and, optionally, the identifier that identifies the distributor or developer of the application.

4. BRIEF DESCRIPTION OF THE DRAWINGS

Like reference numerals refer to corresponding parts throughout the several views of the drawings.

5. DETAILED DESCRIPTION

Figure 1:
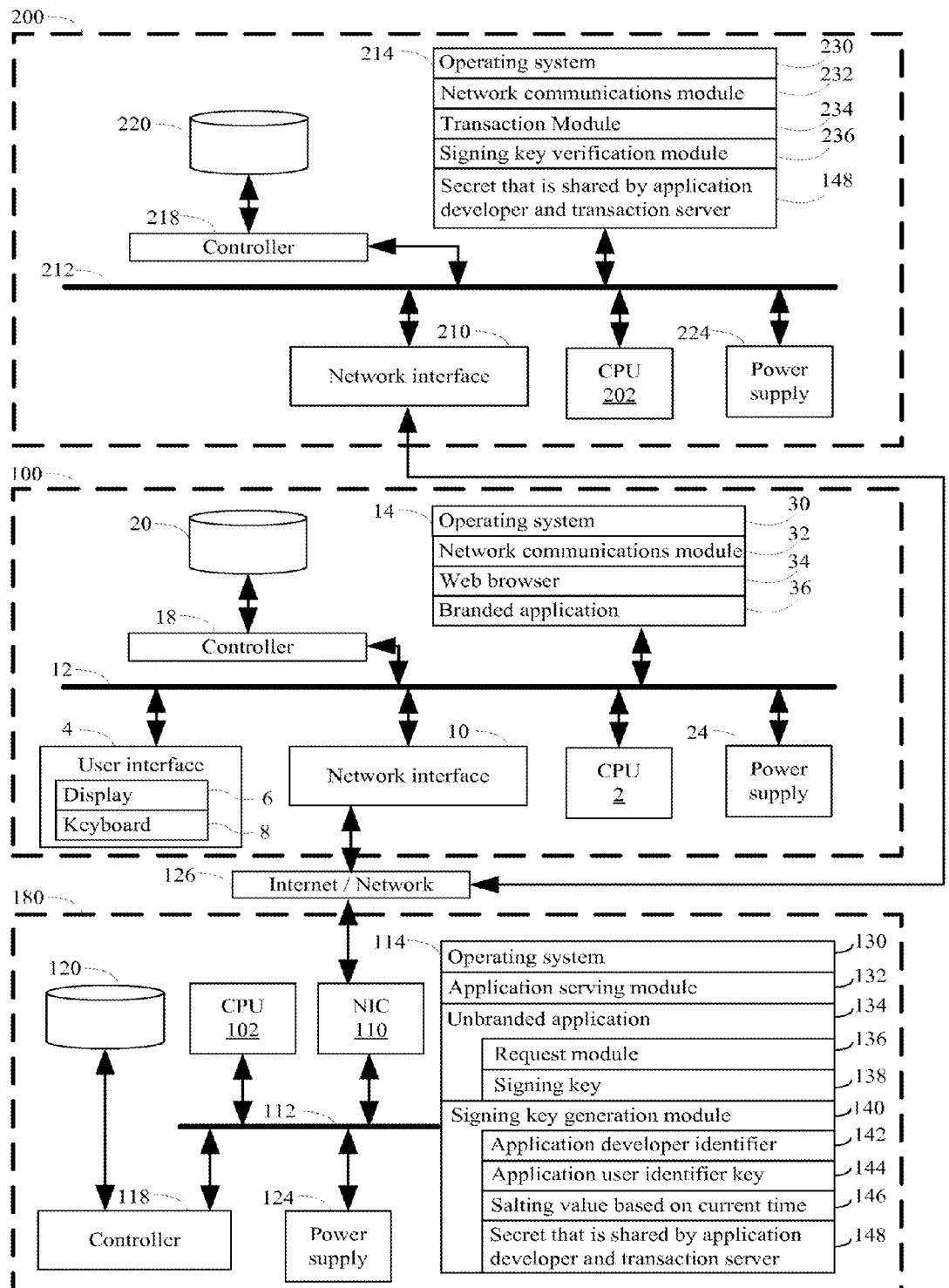
FIG. 1 illustrates a system in accordance with an aspect of the present disclosure.

The present disclosure details novel advances over known systems and methods for authenticating an electronic transaction that is communicated by application that is potentially not secure. The present disclosure makes use of a temporary signing key. The signing key is passed between an application that is potentially not secure, such as a FLASH application running on a client computer, and a secure transaction server. Because the signing key is temporary, the window of opportunity for fraudulent use of the key is de minimis. In other words, if someone were able to construct the signing key, what they would be able to do with it is very limited.

In some embodiments, the signing key is generated from a plurality of parameters that comprises (i) an actual shared secret that is shared between an application developer and the transaction server, (ii) an application user identifier associated with the user of the unsecure application (e.g., a unique to instance of a FLASH game running on a client, in other words, a user requesting an instance of the game is granted a unique application user identifier for that instance of the FLASH game, which instance terminates at the end of the game session), and (iii) a salt value based on a reference time (e.g., integer value of UTC divided by some time period, say one day) such as when the signing key is created. In some embodiments, the plurality of parameters further comprises an application developer identifier given to (or created by) the developer of the unsecure application. This additional parameter is useful when a given application developer makes use of multiple independent currency platforms or transaction configurations. Thus, to prevent users of only one such currency platform or configuration offered by the developer from making unauthorized requests of other currency platforms or configurations offered by the application developer, the application developer can advantageously provide an application developer identifier that identifies a specific currency platform or configuration. Thus, it is possible for the application developer to have any number of application developer identifiers (e.g., one or more application developer identifiers, two or more application developer identifiers, five or more application developer identifiers, and the like) each corresponding to a different currency platform or configuration used by the application developer in one or more applications.

In some embodiments, additional components (parameters) may be used to form a signature key and all such embodiments are encompassed within the present disclosure.

The above-identified components are taken together and hashed to form a unique temporary key that is used by the potentially unsecure application to sign communications with the transaction server. Because the application developer identifier, time period identifier, optional application user identifier key, and secret key requirements specified above, this unique key (the hash value) is only valid for the specified user with the specified application developer during the specified time period (e.g., a particular 24 hour period). Anyone who intercepts the signing key, or a signature produced using the signing key, will be unable to use it to access other user's data or other merchant's data. Moreover, because the unique signing key is based on the shared secret that only the application developer and the transaction server possess, only the application developer and the transaction server are even capable of generating the unique hash key in the first instance. The potentially unsecure application signs individual transaction requests with the signing key. What this means is that the signing key is used as a basis for forming a signature that is included in the transaction using methods that are known to those of skill in the art. When the signed request is received by a transaction server, a check is performed to make sure that the request was signed with a key that is generated from the specified criteria. What is done is that the transaction server tries hashing the same parameters that were used to construct the signing key in the first instance (on the application server). This results in the formation of a reconstructed signing key. Then, the transaction server uses the reconstructed signing key to form a reconstructed signature. The reconstructed signature is then compared to the signature in the request. However, in some embodiments, in order to account for differences in the time between when the signing key was created (and therefore the time based salt value when the signing key was created) and the time when the transaction server receives the signed transaction request, the transaction server will try to form the reconstructed signing key, if necessary, with three different times: (i) the present time, (ii) one time increment (e.g., the next 8 hour interval) into the future, and (iii) one time increment into the past (e.g., the last 8 hour interval). Of course, more time intervals can be attempted in embodiments where further time interval exploration is suitable. In the above example, the hash (formation of a reconstructed signing key) based on the present time is done because this is the most likely correct value to use, the hash (formation of a reconstructed signing key) using the prior time increment is done to permit instances where the user started using the potentially unsecure application in the prior time increment (e.g., if someone starts an instance of a potentially unsecure application at, say 11 PM, it is not desired that they get kicked out of the application one hour later), and the hash (formation of a reconstructed signing key) using the future time increment is done to account for the possibility that there is clock skew between the computer running the potentially unsecure application and the transaction server.

Now that an overview of the novel process methods for conducting secure requests from potentially unsecure application has been disclosed and its advantages have been provided, a more detailed description of a system in accordance with the present application is described in conjunction with FIG. 1. FIG. 1 illustrates the topology of an environment in accordance with the present disclosure.

In the topology, there is an application server 180, a client computer 100, and a transaction computer 200. Of course, other topologies are possible, for instance, application server 180 can in fact comprise several servers. Moreover, typically, there are hundreds, thousands, hundreds of thousands of client computer 100 or more. The exemplary topology shown in FIG. 1 merely serves to most describe the features of the present invention in a manner that will be readily understood to one of skill in the art.

Application server 180 will typically have one or more processing units (CPU's) 102, a network or other communications interface 110, a memory 114, one or more magnetic disk storage devices 120 accessed by one or more controllers 118, one or more communication busses 112 for interconnecting the aforementioned components, and a power supply 124 for powering the aforementioned components. Data in memory 114 can be seamlessly shared with non-volatile memory 120 using known computing techniques such as caching. Memory 114 and/or memory 120 can include mass storage that is remotely located with respect to the central processing unit(s) 102. In other words, some data stored in memory 114 and/or memory 120 may in fact be hosted on computers that are external to application server 180 but that can be electronically accessed by application server 180 over an Internet, intranet, or other form of network or electronic cable (illustrated as element 126 in FIG. 1) using network interface 110.

Memory 114 preferably stores:
an operating system 130 that includes procedures for handling various basic system services and for performing hardware dependent tasks;
an application serving module 132 that is used for connecting application server 180 to various client computers such as client computers 100 (FIG. 1) and possibly to other servers or computers (such as transaction server 200) via one or more communication networks, such as the Internet, other wide area networks, local area networks (e.g., a local wireless network can connect the client computers 100 to application server 180), metropolitan area networks, and so on;
an unbranded application 134 for distribution, upon user request, to a client computer 100; and
a signing key generation module 140 that is used to help brand unbranded application 134 in accordance with the present disclosure.

Application server 180 is connected via Internet/network 126 to one or more client devices 100. FIG. 1 illustrates the connection to only one such client device 100. It is possible for the client device to be a personal computer (e.g., desktop or laptop computer) or any form of mobile computing device (e.g., an I-phone, Blackberry, and the like). In typical embodiments, a client device 100 comprises:
one or more processing units (CPU's) 2;
a network or other communications interface 10;
a memory 14;
optionally, one or more magnetic disk storage devices 20 accessed by one or more optional controllers 18;
a user interface 4, the user interface 4 including a display 6 and a keyboard or keypad 8;
one or more communication busses 12 for interconnecting the aforementioned components; and
a power supply 24 for powering the aforementioned components, which power supply can be, for example, batteries.

In some embodiments, data in memory 14 can be seamlessly shared with optional non-volatile memory 20 using known computing techniques such as caching. In some embodiments the client device 100 does not have a magnetic disk storage device. For instance, in some embodiments, the client device 100 is a portable handheld computing device and the network interface 10 communicates with the Internet/network 126 by wireless means.

The memory 14 preferably stores:
an operating system 30 that includes procedures for handling various basic system services and for performing hardware dependent tasks;
a network communication module 32 that is used for connecting client device 100 to other computers such as application server 180 and transaction server 200;
an optional web browser 34, such as Microsoft Internet Explorer versions 6.0 or later, Firefox 2.x, Firefox 3.x, AOL 9, Opera 9.5 or later, Safari 3.x, Chrome 2.0 or higher, for running a branded application (in some embodiments optional web browser 34 includes a module such as a FLASH player); and
a branded application 36 capable of making signed requests using a signing key 138 in accordance with the present disclosure.

Transaction server 200 will typically have one or more processing units (CPU's) 202, a network or other communications interface 210, a memory 214, one or more magnetic disk storage devices 220 accessed by one or more controllers 218, one or more communication busses 212 for interconnecting the aforementioned components, and a power supply 224 for powering the aforementioned components. Data in memory 214 can be seamlessly shared with non-volatile memory 220 using known computing techniques such as caching. Memory 214 and/or memory 220 can include mass storage that is remotely located with respect to the central processing unit(s) 202. In other words, some data stored in memory 214 and/or memory 220 may in fact be hosted on computers that are external to the transaction server 200 but that can be electronically accessed by the transaction server 200 over an Internet, intranet, or other form of network or electronic cable (illustrated as element 126 in FIG. 1) using network interface 210.

The memory 214 preferably stores:
an operating system 230 that includes procedures for handling various basic system services and for performing hardware dependent tasks;
a network communications module 232 that is used for connecting transaction server 200 to various client computers such as client computers 100 (FIG. 1) and possibly to other servers or computers (such as application server 180) via one or more communication networks, such as the Internet, other wide area networks, local area networks (e.g., a local wireless network can connect the client computers 100 to application server 180), metropolitan area networks, and so on;
transaction module 234 for conducting transactions with branded applications 36 running on various clients 100; and
a signing key verification module 236 for forming a reconstructed signing key, for forming a reconstructed signature form the reconstructed signing key, and for comparing the reconstructed signature with the signature in a signed transaction request serviced by transaction module 234; and
a secret 148 that is shared with application server 180.

Figure 2:
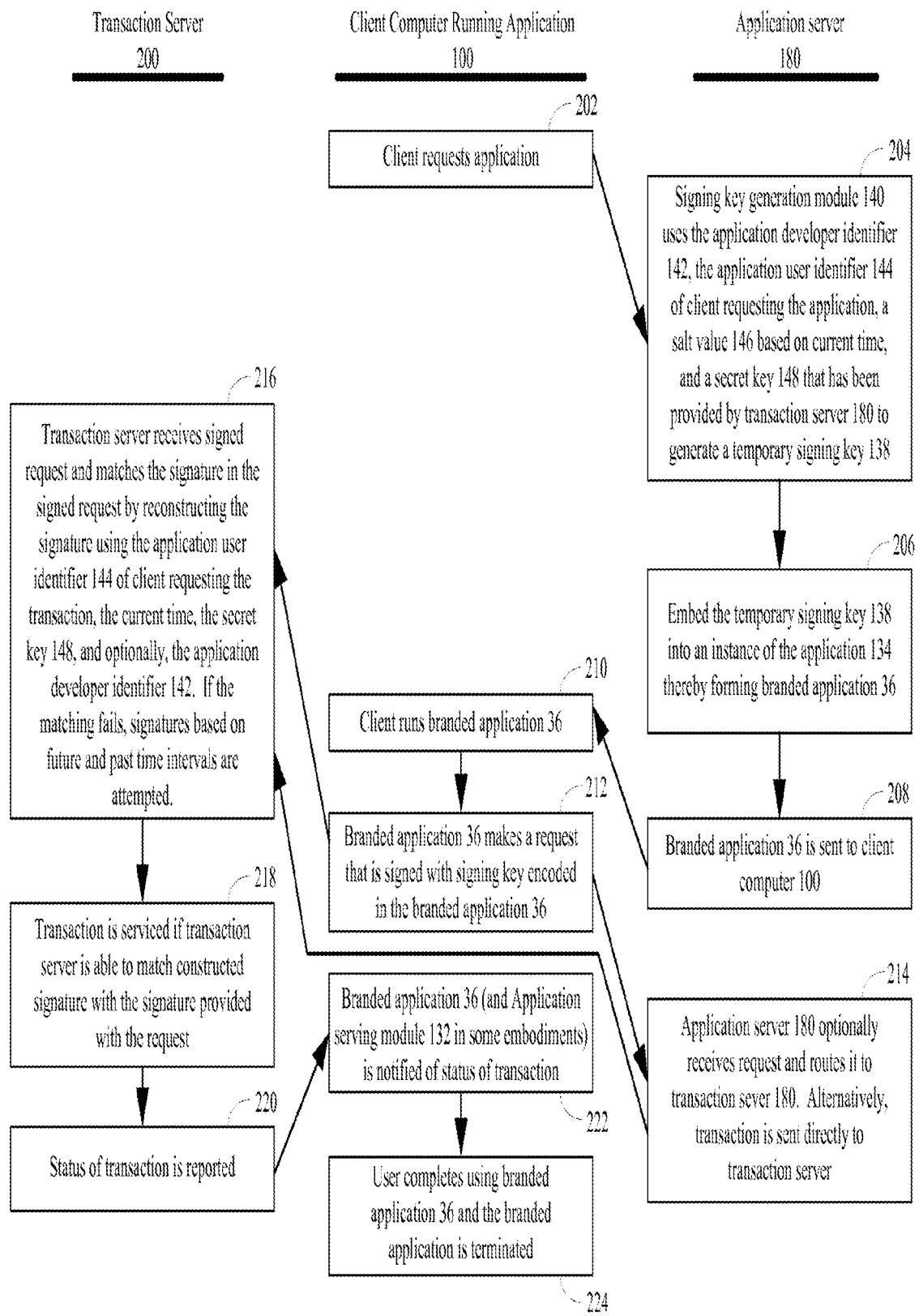
FIG. 2 illustrates a method in accordance with an aspect of the present disclosure.

Referring to FIG. 2, an exemplary method in accordance with one embodiment of the present disclosure is described. The method details the steps taken by an application server 180, a client computer 100, and a transaction server 200 to interactively service a transaction in accordance with the present disclosure.

Step 202. In step 202, a client 100 requests an application. For example, a user who wishes to play an on-line game may use their web browser 34 to select a game. This request is sent to an application server 180 which is charged with authorizing the application in a seamless manner. In some embodiments, the application may already exist on the client 100 in unbranded form and what is required in such embodiments is for the application server 180 is to brand the application so that the application can make transaction requests. In some embodiments, the application does not already exist on the client 100 and what is required in such embodiments is for the application server 180 is to either provide the client with (i) the application in branded form or (ii) the application in unbranded form along with a signing key.

In typical embodiments, the request is sent with the identity of the user (e.g., the application user identifier key 144). In some embodiments, the user has an account with the application developer operating application server 180 and the application user identifier key 144 is a unique identifier associated with this account.

Step 204. In step 204, the signing key generation module 140 generates a temporary signing key. In some embodiments, at least four different parameters are needed to accomplish this task. In some embodiments, at least three different parameters are needed to accomplish this task.

An optional parameter that may be used by the signing key generation module 140 to generate a temporary signing key is an application developer identifier 142. In some embodiments, the identifier 142 uniquely identifies the developer of the application that is to be served to the requesting client 100. In some embodiments, the developer identifier 142 is assigned by the entity that controls the transaction server 200. In some embodiments, the developer identifier 142 is created by the developer and is registered with the transaction server 200. In some embodiments, a given application developer makes use of multiple independent currency platforms or transaction configurations. In such embodiments, to prevent users of only one such currency platform or configuration offered by the developer from making unauthorized requests of other currency platforms or configurations offered by the application developer, the application developer can advantageously provide an application developer identifier 144 that identifies a specific currency platform or configuration. Thus, it is possible for the application developer to have any number of application developer identifiers 144 (e.g., one or more application developer identifiers, two or more application developer identifiers, five or more application developer identifiers, and the like) each corresponding to a different currency platform or configuration used by the application developer in one or more applications. Thus, in some embodiments, the optional first parameter specifies a currency platform or configuration that the application developer has associated with the transaction request of step 202.

The first required parameter that is used by the signing key generation module 140 to generate the signing key is a user identifier key (application user identifier key) 144. In some embodiments, as discussed above in conjunction with step 202 above, the application user identifier key 144 is provided with the request of step 202 originating from the client 100. In some embodiments, the application user identifier key 144 is associated with an account that the user has with the application developer and this account is serviced by the transaction module 234 of the transaction server 214. In some embodiments it is necessary to generate a new application user identifier key in step 204 because the request is not associated with such an identifier. This may be the case, for example, when the user is a new user of the requested application and does not have an account with the application developer. In some embodiments, the application user identifier key is provided by a third party, such as FACEBOOK.

The second required parameter that is used by the signing key generation module 140 to generate the signing key is a salting value 146 based on a reference time. In some embodiments, this salting value is a Coordinated Universal Time (UTC) associated with request 202. For example, the salting value 146 may be UTC when the request of step 202 was originated by client 100, UTC when the request of step 202 was received by the application server 180, UTC when the request is processed in step 204, or some other predetermined function of the time when the request of step 202 was either originated by client 100 or received by application server 180. UTC is a time standard based on International Atomic Time (TAI) with leap seconds added at irregular intervals to compensate for the Earth's slowing rotation. Leap seconds are used to allow UTC to closely track UT1, which is mean solar time at the Royal Observatory, Greenwich. In some embodiments, the salting value 146 is the integer divide of UTC and some time increment, such as one hour, eight hours, twelve hours, or the like.

The third required parameter that is used by the signing key generation module 140 to generate the signing key is a secret key 148 that is shared by the application server 180 and the transaction server 200. A feature of the secret key 148 is that it is not communicated across Internet/network 126 and only the application developer and the host of the transaction server 200 know its identity. See, for example, Section 2.4 of Kaufman, Network Security, Prentice-Hall, Inc., Upper Saddle River, N.J., which is hereby incorporated by reference.

In some embodiments of step 204 the (i) optional application developer identifier 142, (ii) application user identifier 144 of the client requesting the application, (iii) salt value 146 based on time, and (iv) secret key 148 are used to a generate the temporary signing key 138. For example, in some embodiments these four values are truncated together, or otherwise combined, and then one-way hashed to generate the signing key 138.

In some embodiments of step 204 the (i) application user identifier 144 of the client requesting the application, (ii) salt value 146 based on time, and (iii) secret key 148 are used to a generate the temporary signing key 138. For example, in some embodiments these three values are truncated together, or otherwise combined, and then one-way hashed to generate the signing key 138.

In some embodiments, additional values are used to generate the signing key 138.

What follows is a description of what occurs in steps 206 through 210 in those embodiments where the application server 180 brands an application and sends the application to a client 100. In alternative embodiments, the application server 180 does not brand the application, but rather, sends the signing key to the client 100 which, in turn, brands the application.

Step 206. In step 206, the temporary signing key 138 is embedded (associated with) an instance of unbranded application 134 thereby forming the branded application 36. In some embodiments, the branded application 34 is a SWF file comprising bytecode compiled from ADOBE ACTIONSCRIPT versions 1, 2, 3, or later versions, when available. As depicted in FIG. 1, unbranded application 134 includes a request module 136. Once branded, the application further includes a valid signing key 138 and thus becomes a branded application 36. As such, although not shown, branded application 36 include a request module for making transaction requests, and a signing key 138.

Step 208. In step 208, branded application 36 is sent to client computer 100. Advantageously, in various embodiments, the signing key 36 is only valid for a predetermined period of time such as for up to two, three, four, five, six, seven, eight hours after salt value 146 is created, up to twelve hours after salt value 146 is created, up to up one day, two days, three days, for four days after salt value 146 is created, or up to one week, two weeks or three weeks after salt value 146 is created.

Step 210. In step 210, the client runs branded application 36. For example, in some embodiments, the branded application is a FLASH SWF file compiled from ACTIONSCRIPT version 1, 2 or 3. In such embodiments, the web browser 34 makes use of (executes) a FLASH player (not shown) on client 100 to interpret the SWF bytecode. In this way, the application runs. Regardless of the programming language it is implemented in, the branded application 36 can be, for example a game, a social networking application, financial service software, accounting software, tax preparation software, or any other type of application that may need to make a secure transaction request.

Step 212. At step 212, the client makes a secure transaction request. This is done by the request module 136 of the branded application 36. In particular, branded application 36 formulates the request and then signs the request using the signing key 138 thereby incorporating a signature into the request. Because the signature is only valid for a given period of time, and only for the application making the request and only for the specific user requesting the application, even if the signed transaction request were maliciously intercepted and interpreted, the signature within the transaction request could not be used to access accounts gated by transaction server 216 because the validity of the signature is strictly gated by at least time 146, user identifier 144, a secret key associated with a specific application developer 148 and, optionally, by an application developer identifier 142 (application configuration).

Steps 214 and 216. In some embodiments, the request of step 212 is sent to the application server 180, which then sends the request to transaction server 200. This may occur for, example, in order to associate the signed request with the application user identifier key 144 for validation purposes. In other embodiments, the signed request is sent directly to the transaction server 200.

When the transaction server 180 receives the signed requests, the signing key verification module 236 seeks to reconstruct a signature that matches the signature in the transaction request. This is necessary in order to ensure that the request is a legitimate request, as opposed to a request sent by an unauthorized source. In order to reconstruct the signature contained in the request, the signing key verification module 236 requires the same information that the signing key generation module 140 used to build the signing key 138 in the first instance: the (i) application developer identifier 142 (if the signing key generation module 140 used this), (ii) application user identifier 144, (iii) salting value 146, and (iv) secret key 148. For security purposes, in preferred embodiments, the salting value 146 and secret key 148 are not communicated over the Internet. As disclosed in FIG. 1, the transaction server 200 already knows the secret 148. The salting value 146 is reconstructed by the transaction server 200 based on the current time. For instance, if the signing key generation module 140 took the integer divide of UTC and some time increment, such as one hour, so does the signing key verification module 236. The difference here, though, is that the transaction server 200 does not know when the signing key generation module 140 took the integer divide. Thus, in some embodiments, in order to account for differences in time between when the signing key generation module 140 took the integer divide and when the signing key verification module 236 takes the integer divide, the signing key verification module will try three different times: (i) the present time, (ii) one time increment (e.g., the next 8 hour interval) into the future, and (iii) one time increment into the past (e.g., the last 8 hour interval). In such an embodiment, the signing key verification module 236 will create three different reconstructed signing keys, each based on a different time. From the three different reconstructed signing keys, the signing key verification module 236 will create three different reconstructed signatures. In other embodiments, where suitable, even more time increments may be explored, resulting in even more reconstructed signing keys and reconstructed signatures.

In some embodiments, the signing key verification module 236 obtains the application developer identifier 142 and the application user identifier key 144 in an unsigned manner directly from the signed transaction request. In some embodiments, the signing key verification module 236 obtains the application developer identifier 142 and the application user identifier key 144 from the request module 136 along with an identifier that identifies the signed transaction request. Those of skill in the art will recognize that there are any number of ways in which the signing key verification module 236 may obtain these two parameters and all such methods are encompassed by the present disclosure.

Step 218. As disclosed above, once the signing key verification module 236 has the requisite parameters, it is able to reproduce the signing key 138, generate a signature based on the signing key, and compare this generated signature to the signature in the transaction request. If the reconstructed signature generated by the signing key verification module 236 matches the signature in the request, the transaction module 234 services the transaction. For example, the transaction may be an in-game transaction to sell in-game upgrades like level unlocks, virtual equipment, virtual special weapons, cheats, points, or other in-game value such as virtual currency. However, if the signing key verification module 236 is unable to match the reconstructed signature generated by module 236 to the signature in the transaction request, the transaction request is denied and the disclosed process terminates without the disclosure of any account information to the client 100.

Step 220. In step 220, the status of the transaction is reported. For example, in some embodiments, the transaction status may be a binary "success" or "failure" indication. In some embodiments, account information such as virtual currency, actual currency (e.g., account balance) or any other metric of parameter that may be of applicability to a transaction is reported in step 220.

Step 222. In step 222, the branded application 36 and, in some embodiments application serving module 132, are notified of the status of the transaction. For example, in some embodiments, if the transaction was an in-game transaction invoked in order to keep the user in the game, application serving module 132 is notified whether the transaction was successful and, if the transaction was not successful, application serving module 132 prevents the branded application 36 from continuing with the game.

Step 224. In step 224, the user associate with the application user identifier key 144 stops using the branded application 36 and the branded application is terminated.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a computer readable storage medium. For instance, the computer program product could contain the program modules shown in FIG. 1. These program modules can be stored on a CD-ROM, DVD, magnetic disk storage product, or any other tangible computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed:

1. A method for authenticating electronic requests between client computers and transaction servers, comprising:
   receiving, using one or more first computing devices, an electronic application request for an application from a client computer, the electronic request comprising an identity of a user associated with the electronic request;
   constructing, using the one or more first computing devices and responsive to receiving the electronic application request, a signing key as a first function of a first plurality of parameters, the first plurality of parameters comprising a plurality of:
      (i) the identifier that identifies the distributor or developer of the application
      (ii) an identity of a user associated with the electronic request for the application,
      (iii) a first time based salt value, and
      (iv) a secret that is shared between the one or more first computing devices and one or more second computing devices; and
   embedding the signing key in a first version of the application thereby forming a second version of the application, the second version of the application being configured to
      (i) sign a request with the signing key thereby forming a signed request, and
      (ii) submit the signed request to the transaction server with the identity of the user and an identifier that identifies a distributor or developer of the application.

2. The method of claim 1, wherein embedding the signing key in the first version of the application is performed by the one or more first computing devices, and wherein the method further comprises electronically delivering the second version of the application to a client computer.

3. The method of claim 1, wherein embedding the signing key in a first version of the application is performed by a client computer, and wherein the method further comprises, prior to embedding the signing key in the second version of the application electronically delivering the signing key to the a client computer.

4. The method of claim 1, wherein the first function is a hashing function and wherein the signing key is a hash of:
   (i) the identity of the user associated with the electronic request for the application,
   (ii) the identifier that identifies the distributor or developer of the application,
   (iii) the first time based salt value, and
   (iv) the secret that is shared between the one or more first computing devices and the one or more second computing devices.

5. The method of claim 1, wherein the first function is a hashing function and wherein the signing key is a hash of:
   (i) the identity of the user associated with the electronic request for the application,
   (ii) the first time based salt value, and
   (iii) the secret that is shared between the one or more first computing devices and the one or more second computing devices.

6. The method of claim 1, wherein the first time based salt value is an integer divide of:
   (i) Coordinated Universal Time (UTC) associated with receiving the electronic application request for the application, and
   (ii) a predetermined time increment.

7. The method of claim 1, wherein the first time based salt value is an integer divide of:
   (i) Coordinated Universal Time (UTC) associated with constructing the signing key, and
   (ii) a predetermined time increment.

8. The method of claim 1, wherein the signed transaction request is an in-game transaction to buy an in-game upgrade using an account associated with the identity of the user that is maintained on one or more second computing devices.

9. The method of claim 8, wherein the in-game upgrade is a level unlock, a purchase of virtual equipment, a purchase of a virtual special weapon, a purchase of a cheat, or a purchase of virtual currency.

10. The method of claim 1, wherein the second version of the application is a social networking application, a financial services application, an accounting application, or a tax preparation application.

11. The method of claim 1, the method further comprising:
   executing the second version of the application using the client computer, wherein the client computer is suitably programmed to execute the second version of the application;
   using the executed second version of the application to make a request that comprises a signature based upon the signing key; and
   communicating the signed request to one or more second computing devices.

12. The method of claim 11, wherein the signed request includes the identity of the user and the identifier that identifies the distributor or developer of the application.

13. The method of claim 1, the method further comprising:
   receiving, by one or more second computing devices and from the client computer, the signed request comprising a signature based on the signing key embedded in the second version of the application,
   forming, by the one or more second computing devices, a reconstructed signing key,
      wherein the one or more second computing devices are suitably programmed to perform the forming, and wherein the forming comprises applying a second function to a second plurality of parameters;

forming, by the one or more second computing devices, a signature from the reconstructed signing key; and assessing the signed request based on a comparison of the signature formed from the reconstructed signing key and the signature in the transaction request, wherein the assessing (a) achieves a verified state when the signature formed from the reconstructed signing key matches the signature in the transaction request, or (b) achieves a failed state when the signature formed from the reconstructed signing key does not match the signature in the transaction request.

14. The method of claim 13, wherein the second plurality of parameters comprises a plurality of:

(i) the identifier that identifies the distributor or developer of the application, (ii) the identity of the user making the request, (iii) a second time based salt value, and (iv) the secret that is shared between the one or more first computing devices and the one or more second computing devices.

15. The method of claim 14, wherein the second function is a hashing function and wherein the reconstructed signing key is a hash of:

(i) the identity of the user associated with the electronic request for the application, (ii) the identifier that identifies the distributor or developer of the application, (iii) the second time based salt value, and (iv) the secret that is shared between the one or more first computing devices and the one or more second computing devices.

16. The method of claim 14, wherein the second function is a hashing function and wherein the reconstructed signing key is a hash of:

(i) the identity of the user originating the electronic request for the application, (ii) the second time based salt value, and (iii) the secret that is shared between the one or more first computing devices and the one or more second computing devices.

17. The method of claim 14, wherein the second time based salt value is an integer divide of:

(i) Coordinated Universal Time (UTC) associated with the receiving the signed request, forming the reconstructed signing key, or forming the signature from the reconstructed signing key; and (ii) a predetermined time increment.

18. The method of claim 14, wherein, when the failed state is achieved, the method further comprises repeating the forming, forming, and assessing steps specified in claim 14 with the second time based salt value incremented or decremented.

19. The method of claim 13 wherein, when the verified state is achieved, the method further comprises servicing the request, using the one or more second computing devices, wherein the one or more second computing devices is suitably programmed to service the request when the verified state is achieved.

20. The method of claim 13, wherein the one or more first computing devices is a server other than the one or more second computing devices.

21. The method of claim 13, wherein the one or more first computing devices and the one or more second computing devices are the same server.

22. The method of claim 1, wherein the application is a FLASH application.

23. A computer program product, comprising:

a non-transitory computer-readable storage medium having computer-executable program instructions embodied therein that when executed by a computer cause the computer to authenticate electronic requests between client computers and transaction servers, the computer-executable program instructions comprising:

computer-executable program instructions for receiving, by one or more first computing devices, an electronic application request for an application from a client computer; computer-executable program instructions for constructing, using the one or more first computing devices and responsive to receiving the electronic application request, a signing key as a first function of a first plurality of parameters, the first plurality of parameters comprising a plurality of:

(i) an identifier that identifies the distributor or developer of the application, (ii) the identity of the user originating the electronic request for the application, (iii) a first time based salt value, and (iv) a secret that is shared between the one or more first computing devices and one or more second computing devices; and computer-executable program instructions for embedding the signing key in a first version of the application thereby forming a second version of the application, wherein the second version of the application is configured to (i) sign a request with the signing key thereby forming a signed request and (ii) submit the signed request to the transaction server with an identity of a user originating the electronic request, or delivering the signing key to the client computer.

24. A system for authenticating electronic requests between client computers and transaction servers, comprising:

an first server; and a second server, the first server being configured to execute application code instructions that cause the system to:

receive an electronic application request for an application from a client computer, the electronic request comprising an identity of a user originating the electronic request;

construct a signing key as a first function of a first plurality of parameters, the first plurality of parameters comprising a plurality of:

(i) an identifier that identifies the distributor or developer of the application (ii) the identity of a user originating the electronic request for the application, (iii) a first time based salt value, and (iv) a secret that is shared between the first server and the second server; and embed the signing key in a first version of the application thereby forming a second version of the application, the second version of the application being configured to sign a request with the signing key thereby forming a signed request, and submit the signed request to the second server with the identity of the user; and the second server being configured to execute application code instructions that cause the system to:

receive, from the client computer, a signed request, the signed request comprising a signature based upon the signing key embedded in the second version of the application;
form a reconstructed signing key as a second function of a second plurality of parameters;
form a signature from the reconstructed signing key; and
assess the signed request.

25. The system of claim 24, wherein the first function is a hashing function and wherein the signing key is a hash of:
   (i) the identity of the user originating the electronic request for the application,
   (ii) the identifier that identifies the distributor or developer of the application,
   (iii) the first time based salt value, and
   (iv) the secret that is shared between the first server and the second server.

26. The system of claim 24, wherein the second plurality of parameters comprises a plurality of:
   (i) an identity of the user making the request,
   (ii) a second time based salt value, and
   (iii) a secret that is shared between the first server and the second server.

27. The system of claim 24, wherein the assessing the signed request comprises:
   achieving a verified state when the signature formed from the reconstructed signing key matches the signature in the transaction request, or
   achieving a failed state when the signature formed from the reconstructed signing key does not match the signature in the transaction request.

28. The computer program product of claim 23, further comprising computer executable program code for:
   receiving, by the one or more second computing devices and from the client computer, a signed request, the signed request comprising a signature based upon the signing key embedded in the second version of the application;
   forming, by the one or more second computing devices, a reconstructed signing key as a second function of a second plurality of parameters;
   forming, by the one or more second computing devices, a signature from the reconstructed signing key; and
   assessing, by the one or more second computing devices, the signed request,
      wherein the assessing:
         achieves a verified state when the signature formed from the reconstructed signing key matches the signature in the transaction request, or
         achieves a failed state when the signature formed from the reconstructed signing key does not match the signature in the transaction request.

29. The computer program product of claim 28, wherein the second plurality of parameters comprises a plurality of:
   (i) an identity of the user making the request,
   (ii) a second time based salt value, and
   (iii) a secret that is shared between the one or more first computing devices and the one or more second computing devices.

* * * * *